United States Patent
Jhang et al.

(10) Patent No.: US 9,979,527 B2
(45) Date of Patent: May 22, 2018

(54) METHOD FOR HANDLING UL DATA RETRANSMISSION AND COMMUNICATIONS APPARATUS UTILIZING THE SAME

(71) Applicant: MediaTek Inc., Hsin-Chu (TW)

(72) Inventors: Ming-Fong Jhang, Zhubei (TW);
Yu-Cheng Chen, Jhubei (TW);
Sheng-Chieh Wang, New Taipei (TW);
Yu-Ting Yao, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 193 days.

(21) Appl. No.: 14/827,360

(22) Filed: Aug. 17, 2015

(65) Prior Publication Data

US 2016/0057747 A1    Feb. 25, 2016

Related U.S. Application Data

(60) Provisional application No. 62/038,963, filed on Aug. 19, 2014.

(51) Int. Cl.
*H04W 72/04* (2009.01)
*H04W 24/02* (2009.01)
*H04L 5/00* (2006.01)
*H04L 1/18* (2006.01)

(52) U.S. Cl.
CPC .......... *H04L 5/0055* (2013.01); *H04L 1/1812* (2013.01); *H04W 24/02* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 9,295,044 B2* | 3/2016 | Novak | H04W 72/042 |
| 9,717,069 B2* | 7/2017 | Zhou | H04W 72/005 |
| 9,729,286 B2* | 8/2017 | Lee | H04L 5/0044 |
| 2010/0037113 A1* | 2/2010 | Maheshwari | H04L 1/1812 |
| | | | 714/748 |
| 2011/0145672 A1* | 6/2011 | Jongren | H04L 1/1854 |
| | | | 714/748 |
| 2012/0327760 A1* | 12/2012 | Du | H04L 1/1887 |
| | | | 370/216 |
| 2013/0114570 A1* | 5/2013 | Park | H04L 5/0053 |
| | | | 370/335 |

(Continued)

*Primary Examiner* — Candal Elpenord
(74) *Attorney, Agent, or Firm* — McClure, Qualey & Rodack, LLP

(57) ABSTRACT

A communications apparatus includes a radio transceiver and a processor. The radio transceiver receives a plurality of feedback messages from a peer device. The feedback messages are transmitted by the peer device to indicate a result of UL data transmission. The processor analyzes content of the feedback messages to determine a preferred retransmission type of the peer device and records the preferred retransmission type of the peer device in a memory device. When the radio transceiver receives a first UL grant message indicating transmission of a first UL data and the processor determines that a forthcoming first feedback message corresponding to the transmission of the first UL data is unable to be received, the processor determines whether to retransmit the first UL data according to the preferred retransmission type of the peer device.

22 Claims, 13 Drawing Sheets

(56) References Cited

U.S. PATENT DOCUMENTS

2014/0086152 A1* 3/2014 Bontu ................ H04L 1/1812
                                                        370/329
2014/0098719 A1* 4/2014 Kim .................... H04W 4/008
                                                        370/280
2014/0373489 A1* 12/2014 Golub ............... B01D 46/0013
                                                         55/301

* cited by examiner

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | reserved | | 2 |
| 31 | reserved | | 3 |

FIG. 5

METHOD FOR HANDLING UL DATA RETRANSMISSION AND COMMUNICATIONS APPARATUS UTILIZING THE SAME

CROSS REFERENCE TO RELATED APPLICATIONS

This application claims the benefit of U.S. Provisional Application No. 62/038,963 filed 2014 Aug. 19 and entitled "HARQ handling for UE gap", and the entire contents of which are hereby incorporated by reference.

BACKGROUND OF THE INVENTION

Field of the Invention

The invention relates to a method for handling UL data retransmission, and more particularly to a method for handling UL data retransmission with improved retransmission efficiency.

Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communications technologies, it is now possible to provide multiple wireless communications services using different or the same communications technologies in one communications apparatus. In order to provide more efficient communications services, methods for handling UL data retransmission with improved retransmission efficiency are provided.

BRIEF SUMMARY OF THE INVENTION

Communications apparatus and a method for handling UL data retransmission of a communications apparatus comprising a plurality of RAT modules and at least a radio transceiver shared by the RAT modules are provided. An exemplary embodiment of a communications apparatus comprises a radio transceiver and a processor. The radio transceiver receives a plurality of feedback messages from a peer device. The feedback messages are transmitted by the peer device to indicate a result of UL data transmission. The processor analyzes content of the feedback messages to determine retransmission type of the peer device and records the retransmission type of the peer device in a memory device. When the radio transceiver receives a first UL grant message indicating transmission of a first UL data and the processor determines that a forthcoming first feedback message corresponding to the transmission of the first UL data is unable to be received, the processor determines whether to retransmit the first UL data according to the preferred retransmission type of the peer device.

An exemplary embodiment of a method for handling UL data retransmission of a communications apparatus comprising a plurality of RAT modules and at least a radio transceiver shared by the RAT modules comprises: analyzing content of a plurality of feedback messages received from a peer device communicating with a first RAT module of the communications apparatus to determine a preferred retransmission type of the peer device, wherein the feedback messages are transmitted by the peer device to indicate a result of UL data transmission; recording the preferred retransmission type of the peer device in a memory device; receiving a first UL grant message indicating transmission of a first UL data; determining whether a forthcoming first feedback message corresponding to transmission of the first UL data is able to be received; and when the forthcoming first feedback message is determined unable to be received, determining whether to retransmit the first UL data according to the preferred retransmission type of the peer device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5 shows a modulation, TBS index and redundancy version table for PUSCH;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With advancements in communications techniques, the communications apparatuses, such as the mobile stations (MS, which may be interchangeably referred to as user equipment (UE)) are now equipped with multiple radio access technology (RAT) modules and capable of handling multi-RAT's operations, such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or the similar via one communications apparatus.

Figure 1A:
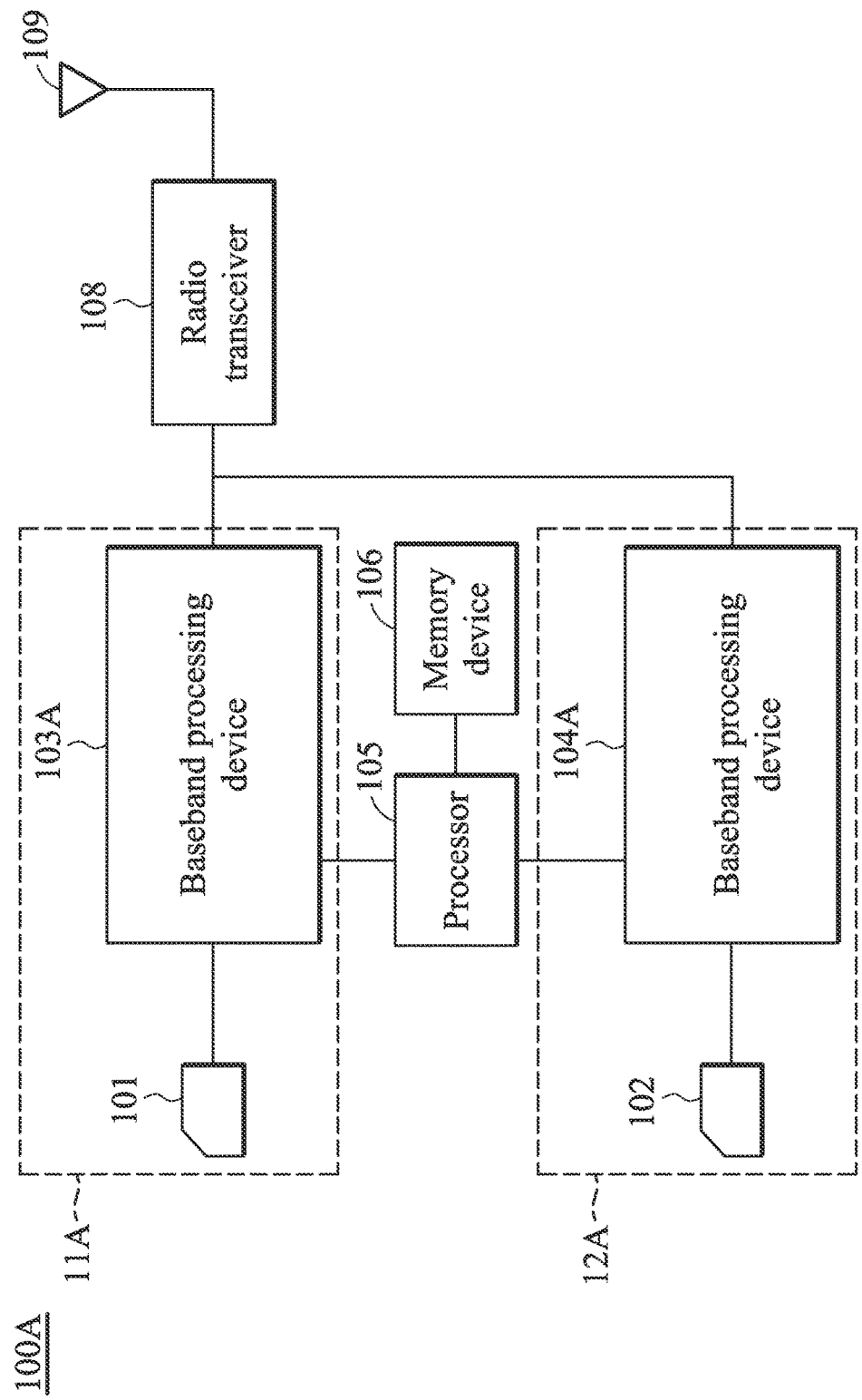
FIG. 1A shows a communications apparatus capable of providing multiple wireless communications services according to an embodiment of the invention.

FIG. 1A shows a communications apparatus capable of providing multiple wireless communications services according to an embodiment of the invention. The communications apparatus 100A may comprise two RAT modules 11A and 12A (which may be different RATs or the same RAT, and the invention should not be limited to either case), a processor 150 coupled to the RAT modules 11A and 12A, a memory device 106, and a radio transceiver 108 and an antenna module comprising at least one antenna 109. According to an embodiment of the invention, the radio transceiver 108 and the antenna module may be shared by the RAT modules 11A and 12A. The RAT module 11A may at least comprise a baseband processing device 103A and may be coupled to or comprise a subscriber identity card 101, and the RAT module 12A may at least comprise a baseband processing device 104A and may be coupled to or comprise a subscriber identity card 102.

The radio transceiver 108 may receive wireless radio frequency signals, convert the received signals to baseband signals to be processed by the baseband processing device 103A and/or 104A, or receive baseband signals from the baseband processing device 103A and/or 104A and convert the received signals to wireless radio frequency signals to be transmitted to a peer device. The radio transceiver 108 may comprise a plurality of hardware devices to perform radio frequency conversion. For example, the radio transceiver 108 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS), or others. The baseband processing devices 103A and 104A may further convert the baseband signals to a plurality of digital signals, and process the digital signals, and vice versa. The baseband processing devices 103A and 104A may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The processor 105 may control the operations of the baseband processing devices 103A and 104A, the radio transceiver 108, and the subscriber identity cards 101 and 102 plugged into two sockets, respectively. The processor 105 may read data from the plugged in subscriber identity cards 101 and 102 and write data to the plugged in subscriber identity cards 101 and 102.

According to an embodiment of the invention, the processor 105 may be arranged to execute the program codes of the corresponding software module of the RAT modules 11A and 12A. The processor 105 may maintain and execute the individual tasks, threads, and/or protocol stacks for the RAT modules 11A and 12A, so as to independently control the operations of the baseband processing devices 103A and 104A, the radio transceiver 108, and the subscriber identity cards 101 and 102 plugged into two sockets, respectively. In the preferred embodiments, two protocol stacks may be implemented so as to respectively handle the radio activities of the individual RAT module. However, it is also possible to implement only one protocol stack to handle the radio activities of the RAT modules at the same time, and the invention should not be limited thereto. Note also that in other embodiments of the invention, the communications apparatus may also be designed to have dual processors. As the communications apparatus 100B shows in FIG. 1B, the processors and memory devices may be integrated in baseband processing devices 103B and 104B of the RAT modules 11B and 12B, respectively, and each processor may maintain and execute the task(s), thread(s), and/or protocol stack(s) for the corresponding RAT module 11B or 12B. Therefore, the invention should not be limited to either case.

Operations of the baseband processing devices 103B and 104B are similar to those of the baseband processing devices 103A and 104A. Regarding the introduction of the baseband processing devices 103B and 104B, reference may be made to the introduction of FIG. 1A, and are omitted here for brevity. Note that the baseband processing devices 103A and 104A or the baseband processing devices 103B and 104B may implemented in different chips or may be integrated in one chip, and the invention should not be limited to either case. Note further that the communications apparatus may also be implemented as comprising only one baseband processing device shared by multi-RAT and supposed to process the baseband signal of multi-RAT and providing multiple wireless communications services as shown in FIG. 1C, and the invention should not be limited to any specific implementation method.

Figure 1B:
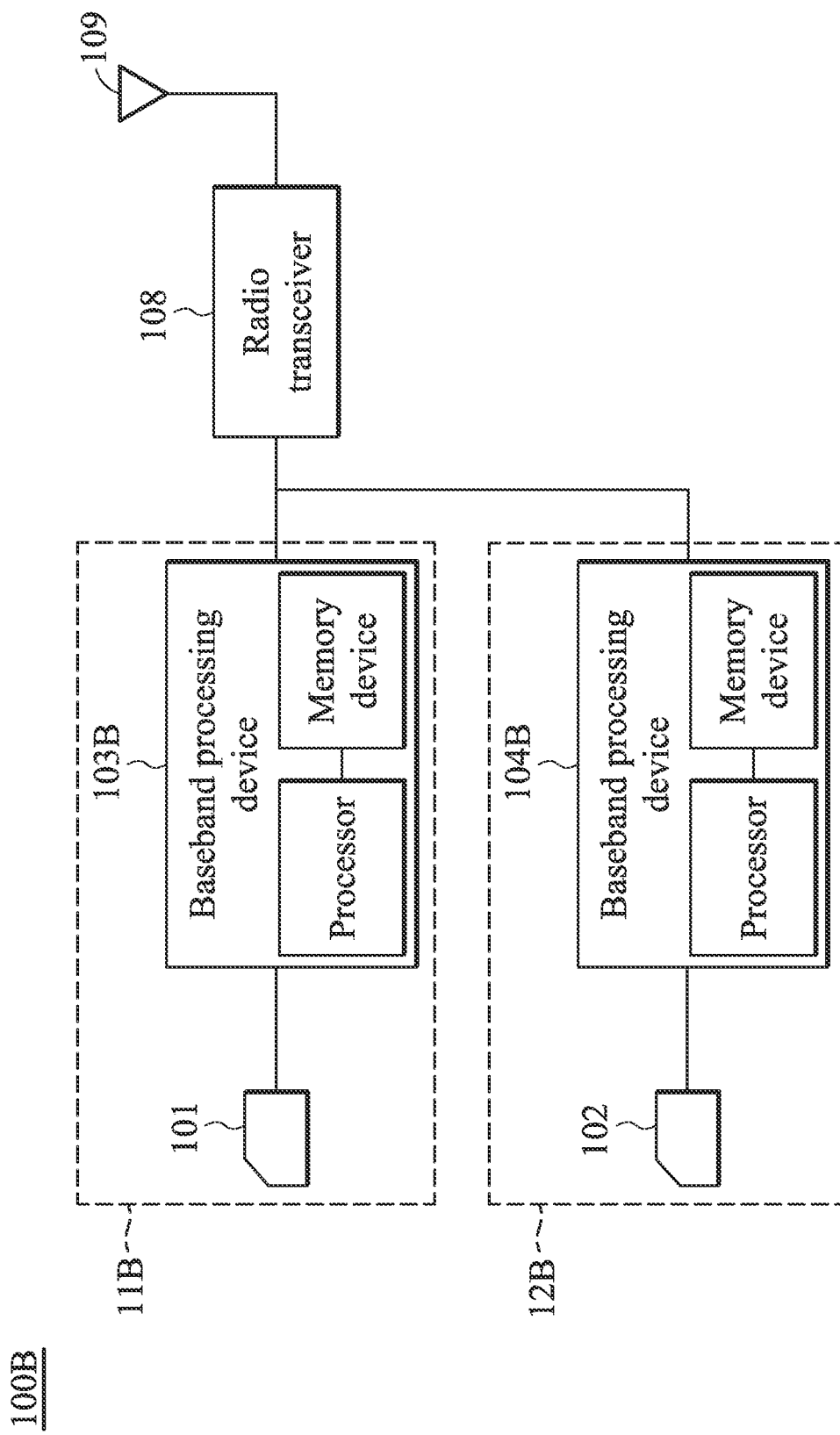
FIG. 1B shows a communications apparatus capable of providing multiple wireless communications services according to another embodiment of the invention.
Figure 1C:
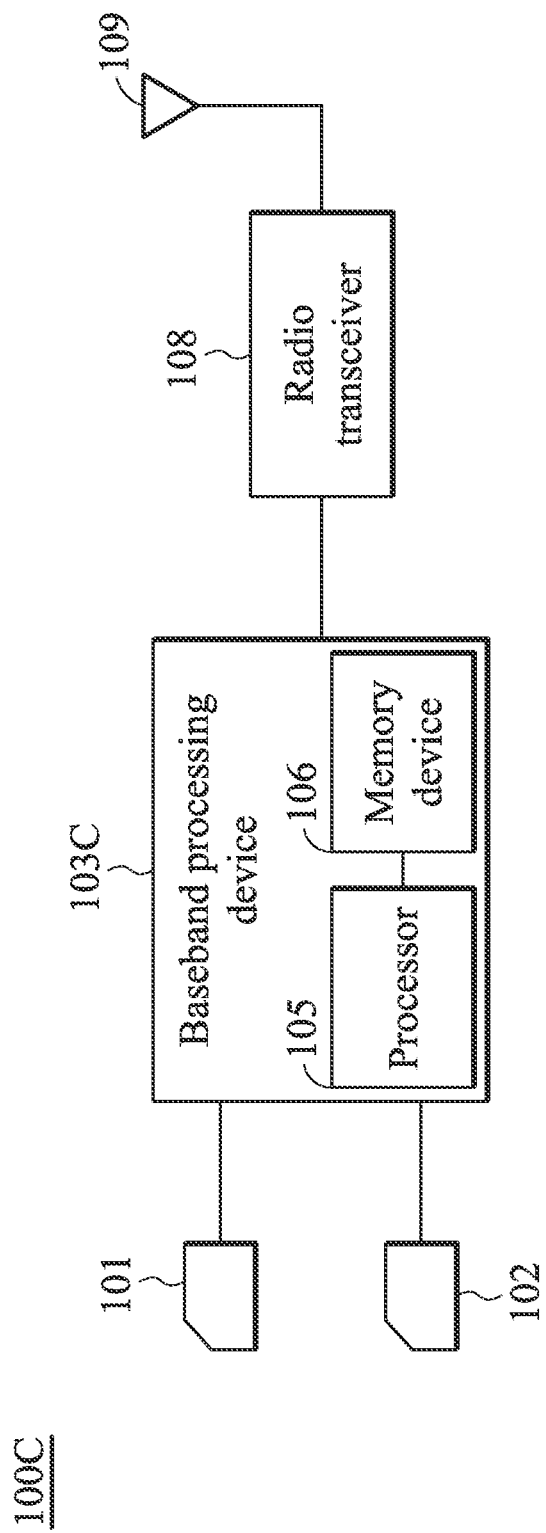
FIG. 1C shows a communications apparatus capable of providing multiple wireless communications services according to yet another embodiment of the invention.

FIG. 1C shows a communications apparatus capable of providing multiple wireless communications services according to yet another embodiment of the invention. In this embodiment, the baseband processing device 103C, the radio transceiver 108 and the antenna module are shared by two RATs corresponding to the two the subscriber identity cards 101 and 102. Operations of the baseband processing device 103C are similar to that of the baseband processing devices 103A and 104A. Regarding the introduction of the baseband processing device 103C, reference may be made to the introduction of FIG. 1A, and are omitted here for brevity. Note that in this embodiment, the subscriber identity card 101 accompanying the baseband processing device 103C may be regarded as one RAT module, and the subscriber identity card 102 accompanying the baseband processing device 103C may be regarded as another RAT module.

Note further that subscriber identity cards 101 and 102 may be dedicated hardware cards, or may be individual identifiers, numbers, addresses, or the likes which are burned in the memory device of the corresponding baseband processing device(s) or processor(s) and are capable of identifying individual communications entity. Therefore, the invention should not be limited to what is shown in the figures. Note further that although communications apparatuses 100A. 100B and 100C shown in FIGS. 1A, 1B and 1C support two RAT wireless communications services, the invention should not be limited thereto. Those who are skilled in this technology can still make various alterations and modifications based on the descriptions given above to derive the communications apparatuses capable of supporting more than two RAT wireless communications services without departing from the scope and spirit of this invention.

Figure 2:
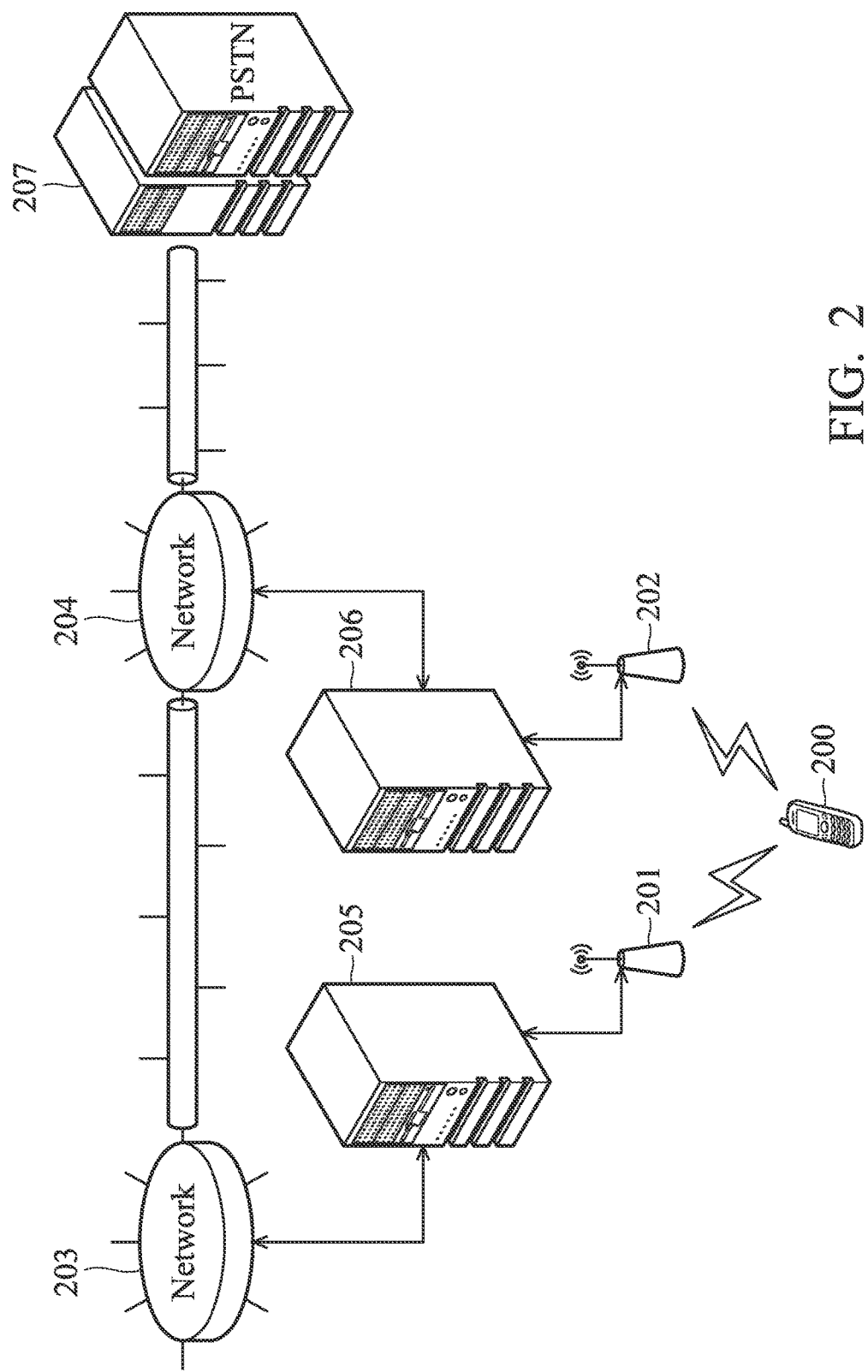
FIG. 2 shows an exemplary network topology according to an embodiment of the invention.

FIG. 2 shows an exemplary network topology according to an embodiment of the invention. The communications apparatus 200 shown in FIG. 2 may be the communications apparatuses 100A, 100B and 100C previously described in FIG. 1A, FIG. 1B and FIG. 1C. Thus, for brevity, the communications apparatus 200 will hereinafter be used to represent all like apparatuses described previously. The communications apparatus 200, equipped with more than one subscriber identity card, may simultaneously access more than one network 203 and 204 of the same or different RATs, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by the access stations 201 and 202, where the access station 201 or 202 may be a base station, a node-B, an evolved node-B (eNode B) or an access point compatible with 802.1a, 802.1b or 802.1g. The communications apparatus 200 may issue an apparatus originated communication request, such as a voice call, a data call, a video call, or a voice over Internet Protocol (VOIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communications apparatus 200 may receive an apparatus terminated communication request, also referred to as mobile terminated (MT) call request, such as an incoming phone call, with any of the subscriber identity cards from a calling party. It is to be understood that there may be one or more gateways positioned between heterogeneous types of networks.

According to an embodiment of the invention, because the radio resources (for example, including at least the radio transceiver 108 and antenna module) are shared by multiple RAT modules as shown in FIGS. 1A, 1B and 1C, the radio activities of different RAT modules may be pre-scheduled and coordinated. The radio activity may be, for example but not limited to, a channel activity for transmitting or receiving information, data, or signaling to or from the corresponding cell, or a measurement activity for performing a power scan or frequency scan of a serving cell or neighbor cell, or others. According to an embodiment of the invention, the radio activities of different RAT modules may be pre-scheduled and coordinated by an arbiter. The arbiter may be a software module or a dedicate hardware device comprised in the communications apparatus 200. When the software module is executed by a processor comprised in the communications apparatus 200, it may become an apparatus to schedule and coordinate the radio activities of different RAT modules. The arbiter may be implemented as an arbiter independent from all the RAT modules, or may be implemented as an arbiter configured in one RAT module, and the invention should not be limited to either case.

According to an embodiment of the invention, the arbiter may receive registration requests for registering forthcoming radio activities in advanced from all the RAT modules or other RAT module(s), depending on the arbiter designs, receive reservation requests for requesting permission to use the radio resources for performing the registered radio activities from all the RAT modules or other RAT module(s), schedule the radio resources for the registered radio activities, and arbitrate (or determine) which RAT module is allowed to use the radio resources when at least one registered radio activity collides with another registered radio activity. Here, the collision means that the time to perform at least one registered radio activity overlaps with the time to perform another registered radio activity.

According to an embodiment of the invention, one or more gap intervals may be provided. The gap interval is provided by one RAT module (for example, RAT 1) having the radio activity with lower priority and collides with the radio activity with higher priority of another RAT module (for example, RAT 2). During the gap interval, the RAT module RAT 1 yields the right of using the shared radio resources to the RAT module RAT 2 having a radio activity with higher priority. Therefore, the RAT module RAT 1 may be temporary off-line or disconnected from the corresponding network during the gap interval.

For example, suppose that the communications apparatus 200 comprises at least a LTE communications module and a GSM communications module. Because a voice call service always has a higher priority than a data call service, when the GSM communications module has to perform a radio activity to listen to paging, the LTE communications module yields the right of using the shared radio resources to the GSM communications module for listening to paging message.

However, because the RAT module RAT 1 cannot use the shared radio resources during the gap interval, some transmitting/receiving opportunities may be missed. For example, when the RAT module RAT 1 is an LTE communications module, the RAT module RAT 1 may have to give up the opportunities of transmitting uplink (UL) data or receiving downlink data, a hybrid ARQ (HARQ) feedback or an UL grant from the corresponding network during the GAP interval. This may cause undesired burden of data transmission/retransmission and result in inefficient communications since the RAT module RAT 1 cannot receive the important transmission/retransmission parameters assigned from the corresponding network during the GAP interval. In order to provide more efficient communications services, methods for handling UL data retransmission with improved retransmission efficiency are provided and discussed in the following paragraphs.

Figure 3:
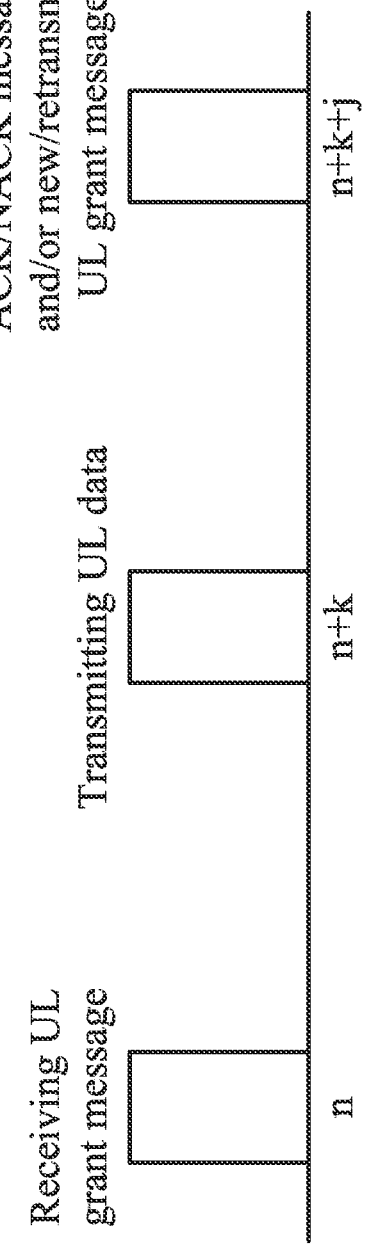
FIG. 3 shows an exemplary LTE UL HARQ transmission procedure.

FIG. 3 shows an exemplary LTE UL HARQ transmission procedure. The communications apparatus may receive an UL grant message from a peer device in the corresponding network at sub-frame (n) and transmit UL data at sub-frame (n+k), which is a first UL opportunity to transmit the UL data. The UL grant carries important UL parameters assigned by the peer device, comprising allowed data size, assigned transmission frequency and the assigned modulation and coding scheme (MCS). After transmitting UL data, the communications apparatus may receive UL HARQ feedback message, a retransmit UL grant message or a new UL grant message from the peer device at sub-frame (n+k+j). The values of parameters k and j depend on network configuration. For example, for FDD system, k=4 and j=4 and for TDD system, the values of parameters k and j are well-defined in a predetermined table.

When the UL data transmission succeeds, the peer device may transmit a new UL grant message to the communications apparatus to indicate a next UL data transmission or a UL HARQ ACK message to indicate success. When the UL data transmission fails, the peer device may transmit a retransmit UL grant message or a UL HARQ NACK message to indicate the failure and indicate a UL data retransmission. Then, the communications apparatus may retransmit the UL data at a second UL opportunity (which can also be regarded as a first retransmit opportunity). The new UL grant message and the retransmit UL grant message can be distinguished from each other via a value of a new data indicator (NDI) carried therein.

Generally, when the peer device transmits a UL HARQ NACK message to the communications apparatus, it implies that a non-adaptive retransmission is adopted. For non-adaptive retransmission, the communications apparatus directly uses the UL parameters assigned in the previous received UL grant message for retransmission. On the other hand, when the peer device transmits a retransmit UL grant message to the communications apparatus, it implies that an adaptive retransmission is adopted.

Figure 4A:
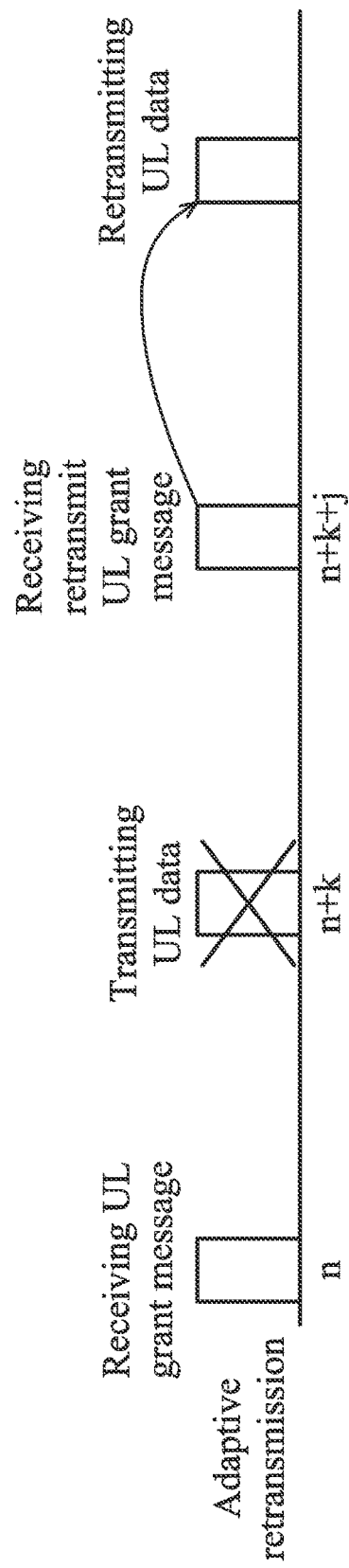
FIG. 4A shows an exemplary adaptive retransmission procedure.

FIG. 4A shows an exemplary adaptive retransmission procedure. The communications apparatus may receive an UL grant message from a peer device in the corresponding network at sub-frame (n) and transmit UL data at sub-frame (n+k). When the UL data transmission fails and the communications apparatus receives a retransmit UL grant message from the peer device at sub-frame (n+k+j), it implies that an adaptive retransmission is adopted. Then may use the parameters carried in the retransmit UL grant message to retransmit the UL data later.

Figure 4B:
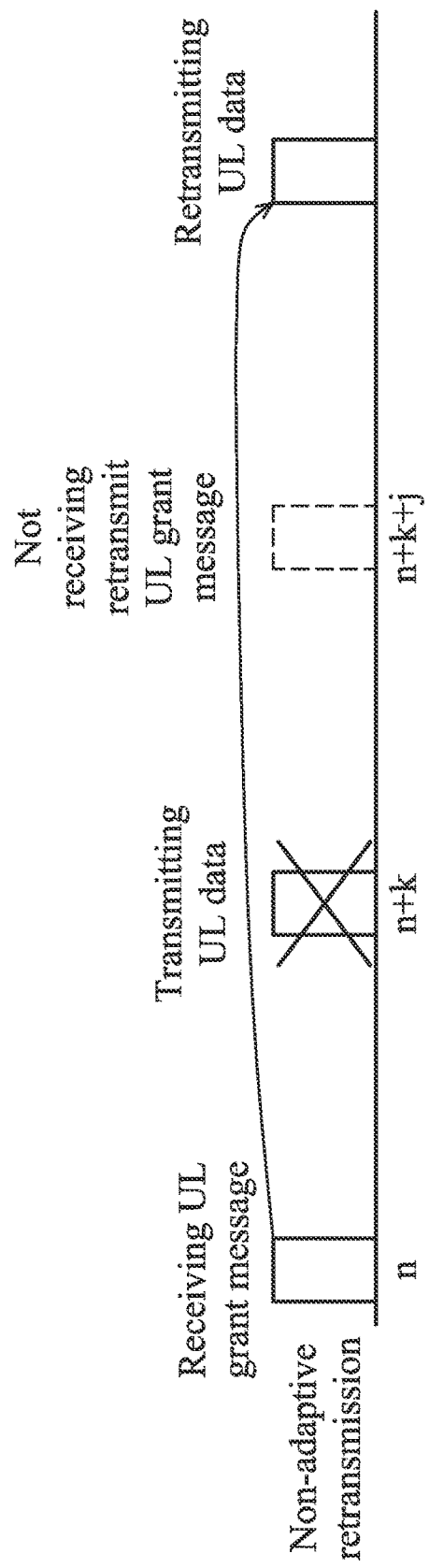
FIG. 4B shows an exemplary non-adaptive retransmission procedure.

FIG. 4B shows an exemplary non-adaptive retransmission procedure. The communications apparatus may receive an UL grant message from a peer device in the corresponding network at sub-frame (n) and transmit UL data at sub-frame (n+k). When the UL data transmission fails and the communications apparatus does not receive a retransmit UL grant message from the peer device at sub-frame (n+k+j), it implies that a non-adaptive retransmission is adopted. For example, the peer device may only transmit a UL HARQ NACK message to indicate the transmission failure. Then, the communications apparatus may use the parameters carried in the original UL grant message received at sub-frame (n) to retransmit the UL data later.

FIG. 5 shows a modulation, TBS index and redundancy version table for PUSCH. The table in FIG. 5 shows the possible values of UL parameters carried in the UL grant message. The parameter $I_{MCS}$ indicates the index of modulation and coding scheme (MCS) assigned by the peer device. The parameter $Q'_m$ indicates the modulation order corresponding to each MCS index. The parameter $I_{TBS}$ indicates the index of transport block size (TBS) corresponding to each MCS index. The parameter $rv_{idx}$ indicates the redundancy version corresponding to each MCS index. For detailed discussions of the table, reference may be made to 3GPP specification: 36.213, and are omitted here for brevity.

As discussed above, when the UL data transmission fails and the communications apparatus receives a retransmit UL grant message from the peer device at sub-frame (n+k+j), it implies an adaptive retransmission is adopted. The adaptive retransmission may further be categorized into two types, adaptive retransmission with dependency and adaptive retransmission without dependency.

When the parameter $I_{MCS}$ carried in the retransmit UL grant message is not larger than 28, it implies that an adaptive retransmission without dependency is adopted since the corresponding UL retransmission parameters are specified in the table shown in FIG. 5. When the parameter $I_{MCS}$ carried in the retransmit UL grant message is larger than 28, for example, $I_{MCS}$=29~31, it implies that an adaptive retransmission with dependency is adopted since some UL retransmission parameters are reserved and depend on the parameters carried in the original UL grant message. In other words, for adaptive retransmission with dependency, the UL retransmission parameters should be referred to the original UL grant message. Therefore, for non-adaptive retransmission and adaptive retransmission with dependency, the communications apparatus cannot retransmit without the information carried in the first UL grant message.

As discussed above, since the gap intervals have to be provided, one RAT module may be unable to receive the first UL grant message which specifies essential UL transmission parameters and/or unable to receive the feedback message to indicate a result of UL data transmission from a peer device during the gap interval. Without the first UL grant message, the RAT module may have no idea about how to transmit the UL data and how to retransmit the UL data. Without the feedback message, the RAT module may have no idea about whether the UL data transmission succeeds and how to retransmit the UL data.

To solve this problem, according to an embodiment of the invention, the processor may record and analyze content of a plurality of feedback messages which have been received from the peer device via the radio transceiver 108 to determine a preferred retransmission type of the peer device for the RAT module. The preferred retransmission type of the peer device may be determined according to a statistic result of the content of the feedback messages received from the peer device. For example, the processor may record the retransmission type explicitly or implicitly indicated by the peer device according to the content of the received feedback messages and count the number of times for each retransmission type being adopted or selected by the peer device. The retransmission type that the peer device most frequently adopts may be determined as the preferred retransmission type of the peer device. For another example, the peer device may also directly provide information regarding its preferred retransmission type, so that the communications apparatus 200 does not have to perform the above-discussed statistics. The preferred retransmission type of the peer device may further be recorded in the memory device. When the radio transceiver receives a first UL grant message indicating transmission of a first UL data and the processor determines that a forthcoming first feedback message corresponding to the transmission of the first UL data is unable to be received, the processor may determine whether to retransmit the first UL data according to the preferred retransmission type of the peer device.

According to an embodiment of the invention, the feedback messages may comprise at least one of a retransmit UL grant message and an UL HARQ ACK/NACK message. To further illustrate the concept of the invention, two scenarios are introduced in the following paragraphs.

Figure 6:
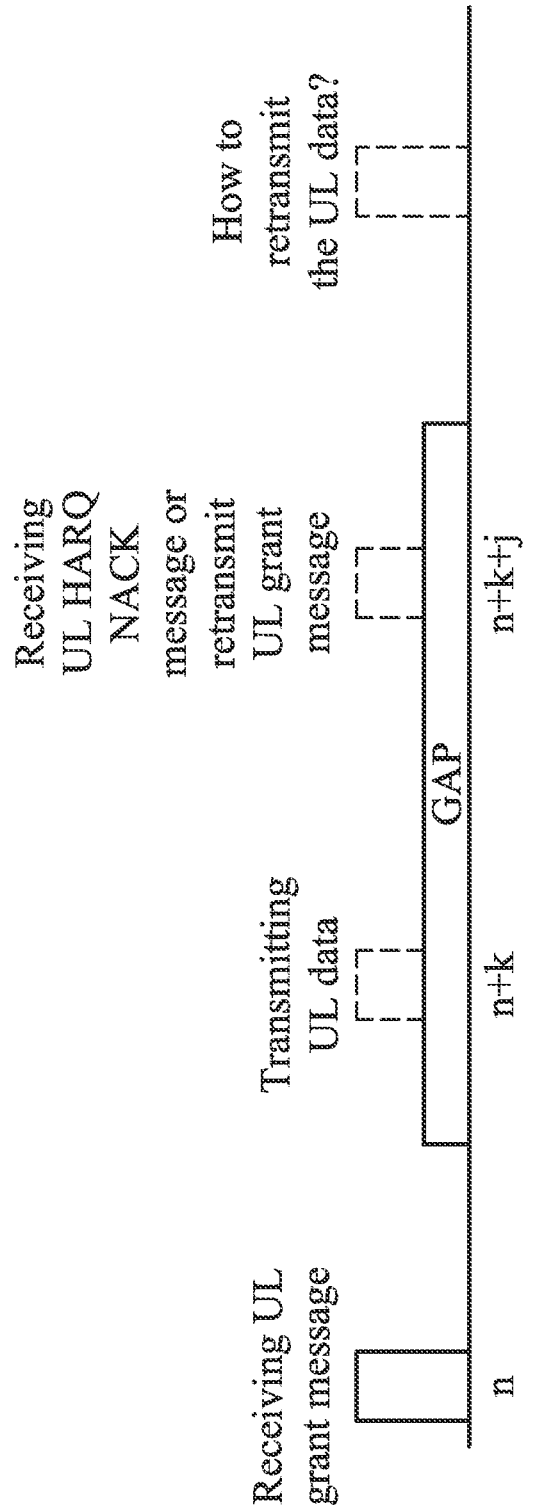
FIG. 6 shows a first exemplary transmission scenario.

FIG. 6 shows a first exemplary transmission scenario. One RAT module (for example, RAT 1) of the communications apparatus may receive an UL grant message from a peer device in the corresponding network at sub-frame (n), but is unable to transmit UL data at sub-frame (n+k) and also unable to receive the UL HARQ NACK message or retransmit UL grant message at the sub-frame (n+k+j) since the time of the sub-frame (n+k) and the time of the sub-frame (n+k+j) both fall in the gap interval provided by the RAT module RAT 1. As discussed above, in the gap interval provided by the RAT module RAT 1, the shared radio resources are occupied by another RAT module (for example, RAT 2) of the communications apparatus. Without the UL HARQ NACK message or retransmit UL grant message, the RAT module RAT 1 may have no idea about how to retransmit the UL data.

To solve this problem, based on the concept of the invention, when the processor (or, the processor of the RAT module RAT 1) determines that the RAT module RAT 1 is unable to transmit the UL data at a first UL opportunity and unable to receive a forthcoming first feedback message, the processor may determine whether to retransmit the UL data at a second UL opportunity according to the preferred retransmission type of the peer device.

According to an embodiment of the invention, when the preferred retransmission type of the peer device is a non-adaptive retransmission, the processor may direct the RAT module RAT 1 to retransmit the UL data according to a plurality of parameters carried in the UL grant message previously received at sub-frame (n).

According to another embodiment of the invention, when the preferred retransmission type of the peer device is an adaptive retransmission, the processor may direct the RAT module RAT 1 to skip and not to retransmit the UL data at the first retransmit opportunity.

No matter whether the first retransmission is skipped or not, after the first retransmission, the RAT module RAT 1 may further receive a feedback message regarding the first retransmission from the peer device, and may further preform transmission or retransmission according to the information carried in the feedback message.

Note that in the embodiments of the invention, the preferred retransmission type of the peer device may be a current statistic result of the content of the feedback messages received from the peer device, which may be dynamically updated, or may be a previously stored record of the peer device, and the invention should not be limited to either case.

In addition, according to an embodiment of the invention, wherein when the number of UL HARQ NACK message(s) is the highest among the feedback messages received from the peer device, the preferred retransmission type of the peer device may be determined as a non-adaptive retransmission. When the number of retransmit UL grant message(s) with a modulation and coding scheme index larger than 28 is the highest among the feedback messages received from the peer device, the preferred retransmission type of the peer device may be determined as an adaptive retransmission with dependency. When the number of retransmit UL grant message(s) with a modulation and coding scheme index not larger than 28 is the highest among the feedback messages received from the peer device, the preferred retransmission type of the peer device may be determined as an adaptive retransmission without dependency.

Figure 7:
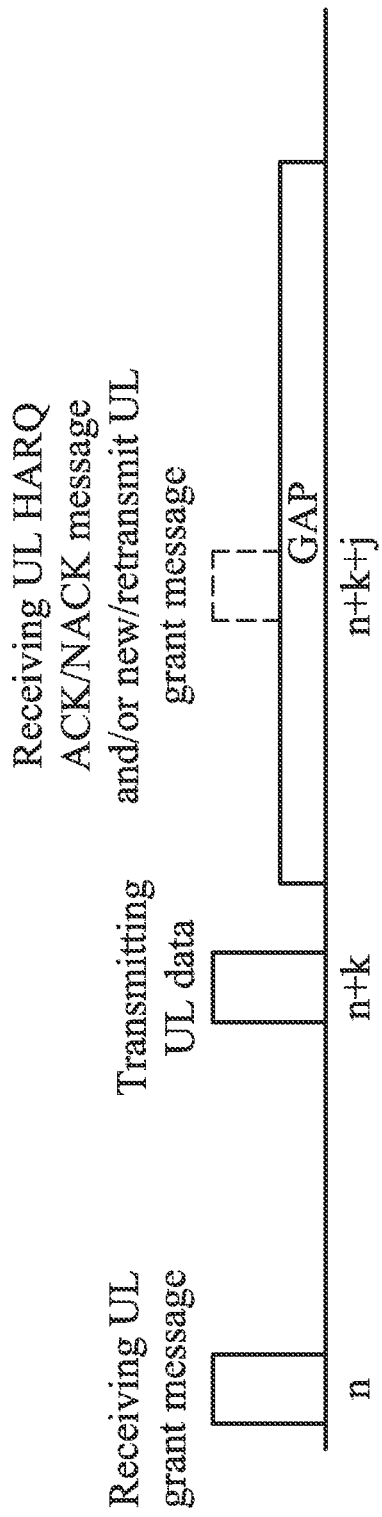
FIG. 7 shows a second exemplary transmission scenario.

FIG. 7 shows a second exemplary transmission scenario. One RAT module (for example, RAT 1) of the communications apparatus may receive an UL grant message from a peer device in the corresponding network at sub-frame (n) and is able to transmit UL data at sub-frame (n+k), but is unable to receive the UL HARQ ACK/NACK message and/or new/retransmit UL grant message at the sub-frame (n+k+j) since the time of the sub-frame (n+k+j) falls in the gap interval provided by the RAT module RAT 1. Without the feedback message, the RAT module RAT 1 may have no idea about whether the UL data transmission is successful or not. When the UL data transmission fails, the RAT module RAT 1 may also have no idea about how to retransmit the UL data. When the UL data transmission is successful, the RAT module RAT 1 may still have no idea about whether or how to transmit a new UL data since the RAT module RAT 1 cannot receive a new UL grant message at the sub-frame (n+k+j).

Figure 8:
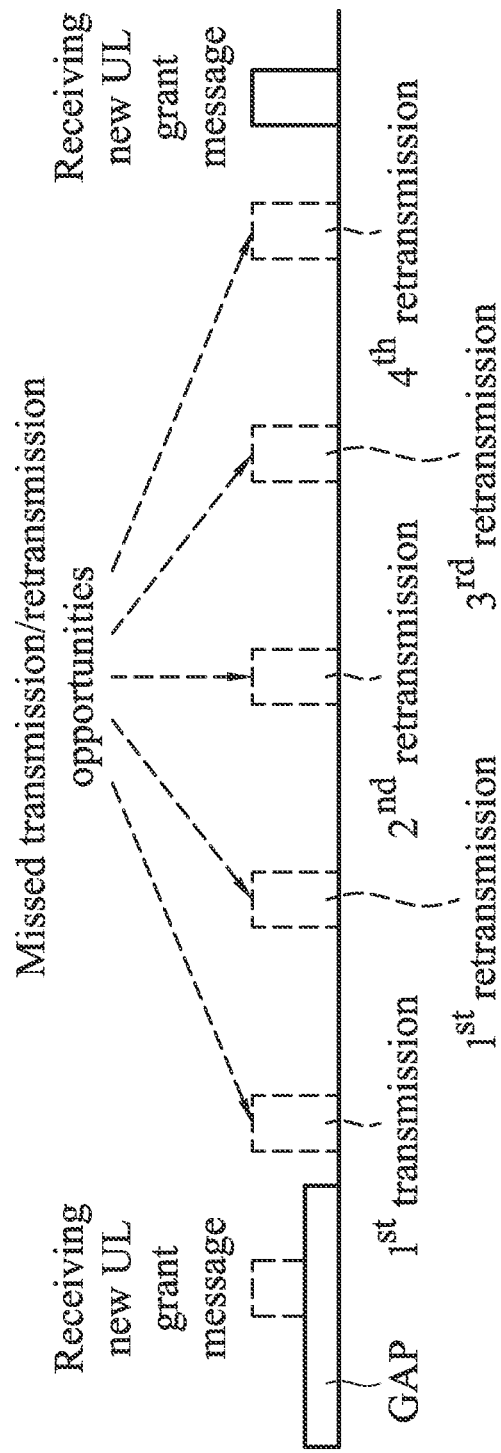
FIG. 8 shows an undesired result for second exemplary transmission scenario.

FIG. 8 shows an undesired result for second exemplary transmission scenario. As shown in FIG. 8, when the peer device indeed transmits a new UL grant message at the sub-frame (n+k+j) in the gap interval, the RAT module RAT 1 may have no idea about the grant of a new UL data transmission since the new UL grant message is unable to be received. The situation is even worse when the peer device adopts non-adaptive retransmission or an adaptive retransmission with dependency because the essential UL transmission parameters are carried in the new UL grant message that the RAT module RAT 1 is unable to receive in the gap interval and the peer device would not transmit the essential UL transmission parameters again. In this manner, the RAT module RAT 1 may waste all of the transmission and retransmission opportunities to transmit and retransmit the UL data as the transmission and retransmission opportunities shown by the dotted lines in FIG. 8, and may only resume normal UL transmission after receiving a new UL grant message because the peer device will wait for N times of transmission (including retransmission) before it gives up the UL transmission then sends a new UL grant to the RAT module RAT 1.

To solve this problem, based on the concept of the invention, when the processor (or, the processor of the RAT module RAT 1) determines that the RAT module RAT 1 is able to transmit the UL data at a first UL opportunity but unable to receive a forthcoming first feedback message, the processor may determine whether to skip a first UL opportunity to transmit the first UL data or intentionally make the transmission of the first UL data fail according to the preferred retransmission type of the peer device.

Note that, in the embodiments of the invention, the preferred retransmission type of the peer device may be a current statistic result of the content of the feedback messages received from the peer device, which may be dynamically updated, or may be a previously stored record of the peer device, and the invention should not be limited to either case.

As discussed above, for non-adaptive retransmission and adaptive retransmission with dependency, the communications apparatus cannot retransmit without the information carried in the first UL grant message.

Since the successful rate of data transmission is generally higher than the failure rate, in order to avoid missing the chance to receive a new UL grant message as shown in FIG. 8, according to an embodiment of the invention, when the preferred retransmission type of the peer device is a non-adaptive retransmission or an adaptive retransmission with dependency, the processor may to skip the first UL opportunity or intentionally make the transmission of the first UL data at the first UL opportunity fail. Note that according to another embodiment of the invention, when the number of UL HARQ NACK message(s) plus the number of retransmit UL grant message(s) with a modulation and coding scheme index larger than 28 is higher than the number of retransmit UL grant message(s) with a modulation and coding scheme index not larger than 28, the processor may also determine to skip the first UL opportunity or intentionally make the transmission of the first UL data at the first UL opportunity fail.

In this manner, the peer device will not send a new UL grant message in the gap interval as shown in FIG. 8. According to an embodiment of the invention, the processor may direct the RAT module RAT 1 to retransmit the UL data according to a plurality of parameters carried in the first UL grant message previously received after the gap interval.

Figure 9:
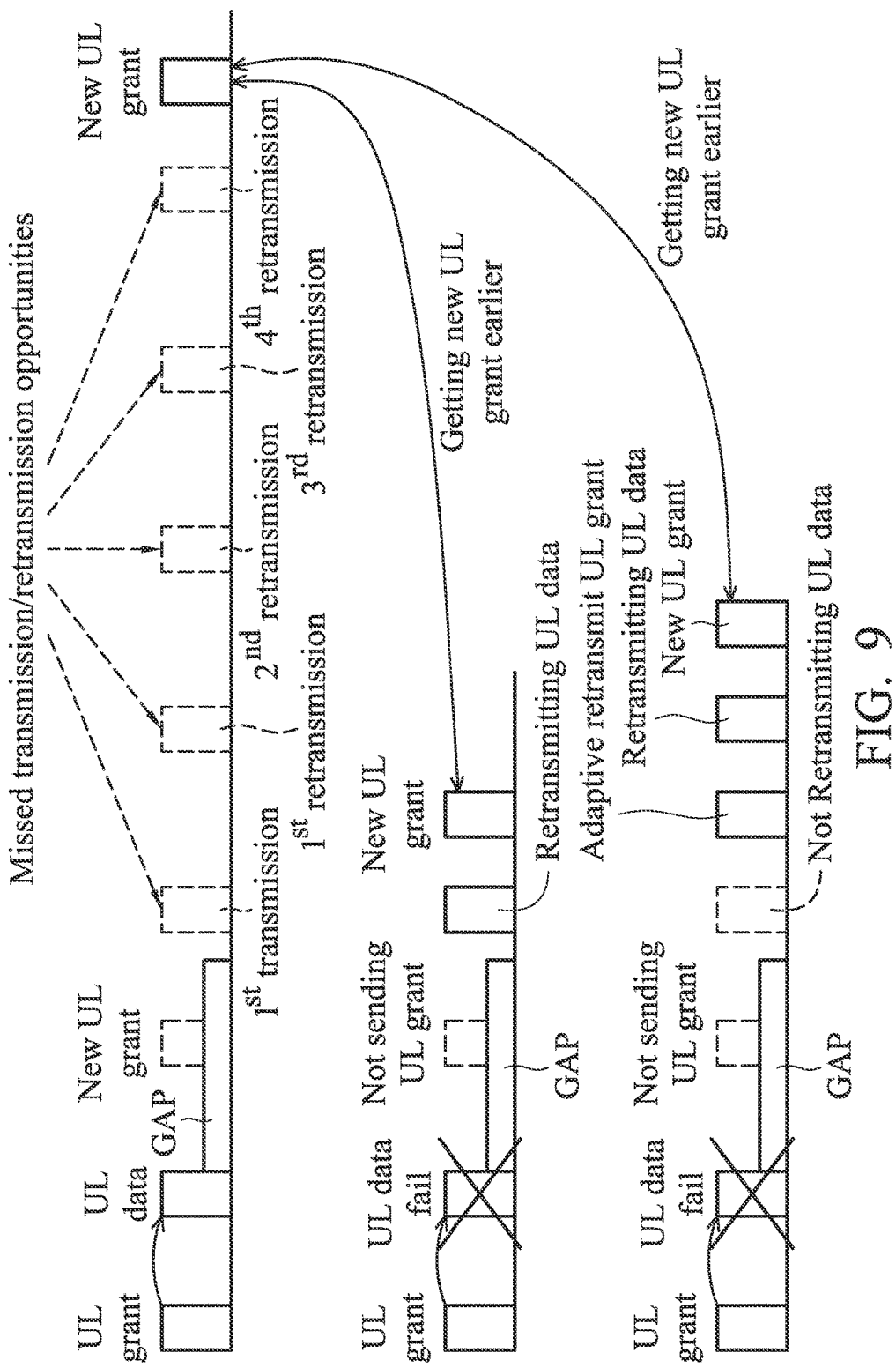
FIG. 9 shows an undesired result for second exemplary transmission scenario, a desired result for second exemplary transmission scenario when the invention concept is applied for non-adaptive retransmission and another desired result for second exemplary transmission scenario when the invention concept is applied for adaptive retransmission with dependency according to an embodiment of the invention.

FIG. 9 shows an undesired result for second exemplary transmission scenario (in the top row), a desired result for second exemplary transmission scenario when the invention concept is applied for non-adaptive retransmission (in the middle row) and another desired result for second exemplary transmission scenario when the invention concept is applied for adaptive retransmission with dependency (in the bottom row) according to an embodiment of the invention. In the top row, an undesired result for second exemplary transmission scenario is shown. Similar to FIG. 8, when the UL data transmission is successful but the RAT module RAT 1 misses the chance to receive a new UL grant message during the gap interval, all of the transmission and retransmission opportunities to transmit and retransmit the UL data are wasted.

In the middle row, a desired result for second exemplary transmission scenario when the invention concept is applied for non-adaptive retransmission is shown. According to an embodiment of the invention, when the processor determines to skip the first UL opportunity or intentionally make the transmission of the UL data at the first UL opportunity fail, the peer device will not send a new UL grant message during the gap interval. After the gap interval, the processor may direct the RAT module RAT 1 to retransmit the UL data according to a plurality of parameters carried in the first UL grant message previously received. When the retransmission is successful, the RAT module RAT 1 may further receive a new UL grant message.

In the bottom row, another desired result for second exemplary transmission scenario when the invention concept is applied for adaptive retransmission with dependency is shown. According to an embodiment of the invention, when the processor determines to skip the first UL opportunity or intentionally make the transmission of the UL data at the first UL opportunity fail, the peer device will not send a new UL grant message during the gap interval. After the gap interval, the processor may skip the first retransmit opportunity and not retransmit the UL data. When the peer device finds out that the retransmission fails, the peer device may send an adaptive retransmit UL grant. Up receiving the adaptive retransmit UL grant message, the processor may direct the RAT module RAT 1 to retransmit the UL data according to a plurality of parameters carried in the adaptive retransmit UL grant message. When the retransmission is successful, the RAT module RAT 1 may further receive a new UL grant message.

Note that, compared to the top row, in the middle and bottom row of FIG. 9, the new UL grant message can be received earlier as indicated by the arrow. Therefore, retransmission efficiency can be greatly improved. Note further that, in the embodiments of the invention, retransmitting the UL data after the gap interval may be a preferable choice when the preferred retransmission type of the peer device is a non-adaptive retransmission, and may not be a preferable choice when the preferred retransmission type of the peer device is an adaptive retransmission with dependency.

Figure 10:
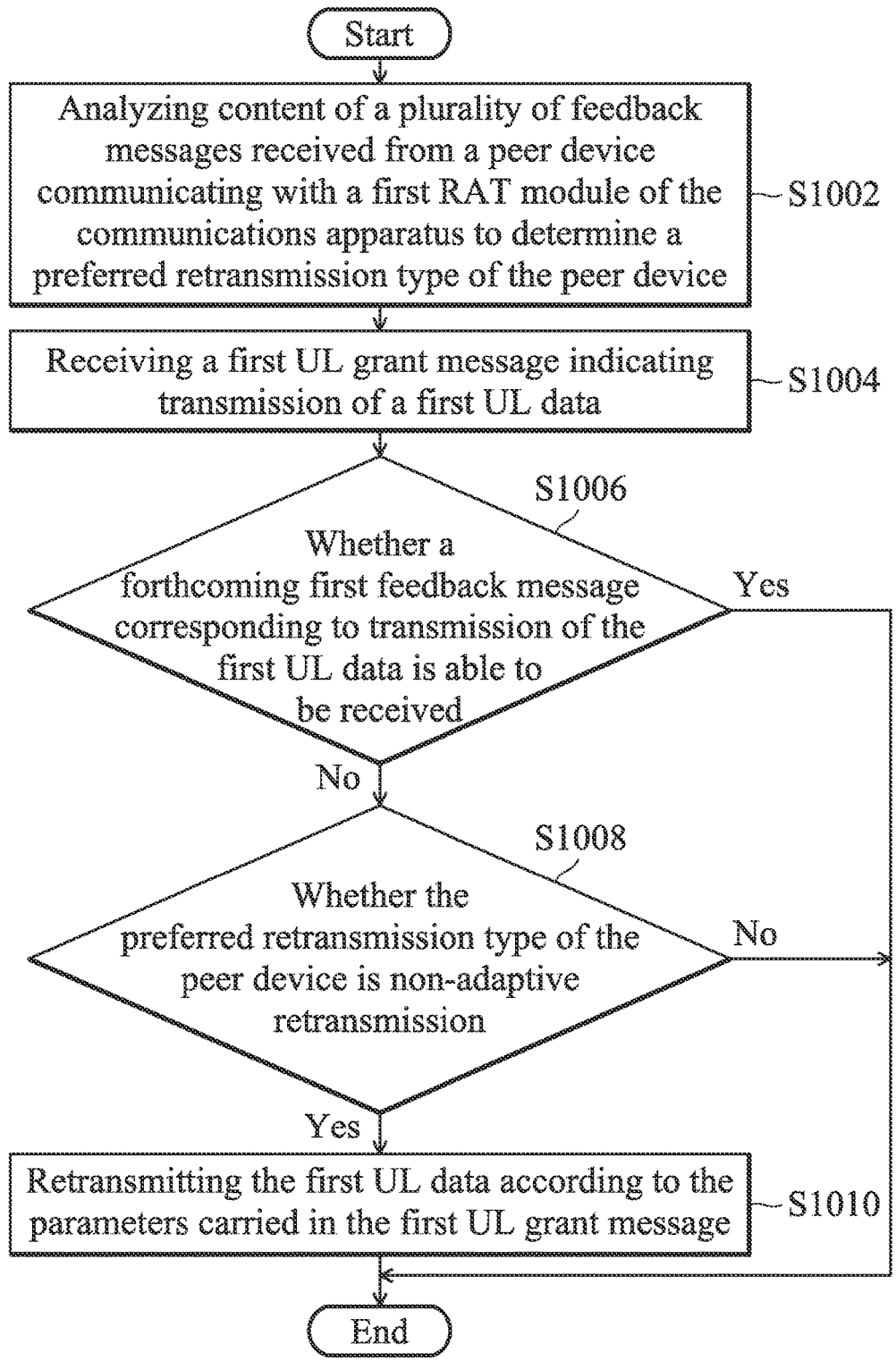
FIG. 10 shows a flow chart of method for handling UL data retransmission of a communications apparatus comprising a plurality of RAT modules and at least a radio transceiver shared by the RAT modules according to an embodiment of the invention.

FIG. 10 shows a flow chart of method for handling UL data retransmission of a communications apparatus comprising a plurality of RAT modules and at least a radio transceiver shared by the RAT modules according to an embodiment of the invention. In the embodiment of the invention, content of a plurality of feedback messages received from a peer device communicating with a first RAT module of the communications apparatus is analyzed to determine a preferred retransmission type of the peer device (Step S1002). The feedback messages are transmitted by the peer device to indicate a result of UL data transmission. When a first UL grant message indicating transmission of a first UL data is received (Step S1004), the first RAT module determines whether a forthcoming first feedback message corresponding to transmission of the first UL data is able to be received (Step S1006). When the forthcoming first feedback message is determined unable to be received, the first RAT module further determines whether the preferred retransmission type of the peer device is non-adaptive retransmission (Step S1008). When the preferred retransmission type of the peer device is non-adaptive retransmission, the first RAT module retransmits the first UL data according to the parameters carried in the first UL grant message (Step S1010).

As discussed above, by applying the proposed methods and/or invention concept, retransmission efficiency can be greatly improved.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

Although the above descriptions use a LTE module and a GSM module as the multi-RAT modules comprised in the communications apparatus, it is for illustrative purpose rather than a limitation. In other words, the present invention is not limited to using a LTE module and a GSM module.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
    a radio transceiver, receiving a plurality of feedback messages from a peer device, wherein the feedback messages are transmitted by the peer device to indicate a result of UL data transmission; and
    a processor, analyzing content of the feedback messages to determine a preferred retransmission type of the peer device and recording the preferred retransmission type of the peer device in a memory device, wherein the preferred retransmission type is selected from a group comprising a non-adaptive retransmission, an adaptive retransmission with dependency and an adaptive retransmission without dependency, and
    wherein when the radio transceiver receives a first UL grant message indicating transmission of a first UL data and the processor determines that a forthcoming first feedback message corresponding to the transmission of the first UL data is unable to be received, the processor determines whether to retransmit the first UL data according to the preferred retransmission type of the peer device.

2. The communications apparatus as claimed in claim 1, wherein the feedback messages comprise at least one of a retransmit UL grant message and an UL HARQ ACK/NACK message.

3. The communications apparatus as claimed in claim 1, wherein the processor further determines whether to skip a first UL opportunity to transmit the first UL data or make the transmission of the first UL data fail according to the preferred retransmission type of the peer device.

4. The communications apparatus as claimed in claim 3, wherein the processor determines to skip the first UL opportunity or make the transmission of the first UL data at the first UL opportunity fail when the preferred retransmission type of the peer device is a non-adaptive retransmission or an adaptive retransmission with dependency.

5. The communications apparatus as claimed in claim 3, wherein the processor further determines whether the first UL data is able to be transmitted at the first UL opportunity, and when the processor determines that the first UL data is able to be transmitted at the first UL opportunity but the forthcoming first feedback message is unable to be received, the processor determines to skip the first UL opportunity or make the transmission of the first UL data at the first UL opportunity fail, and retransmits the first UL data at a second UL opportunity.

6. The communications apparatus as claimed in claim 5, wherein the forthcoming first feedback message is unable to be received when the radio transceiver is occupied by another RAT module at the time when the forthcoming first feedback message arrives.

7. The communications apparatus as claimed in claim 1, wherein the processor further determines whether the first UL data is able to be transmitted at a first UL opportunity, and when the processor determines that the first UL data is unable to be transmitted at the first UL opportunity and the forthcoming first feedback message is unable to be received, the processor determines to retransmit the first UL data at a second UL opportunity when the preferred retransmission type of the peer device is a non-adaptive retransmission and determines to not to retransmit the first UL data when the preferred retransmission type of the peer device is an adaptive retransmission.

8. The communications apparatus as claimed in claim 7, wherein the first UL data is unable to be transmitted at the first UL opportunity and the forthcoming first feedback message is unable to be received when the radio transceiver is occupied by another RAT module at the time of the first UL opportunity and at the time when the forthcoming first feedback message arrives.

9. The communications apparatus as claimed in claim 1, wherein when the preferred retransmission type of the peer device is a non-adaptive retransmission, the processor determines to retransmit the first UL data according to a plurality of parameters carried in the first UL grant message.

10. The communications apparatus as claimed in claim 2, wherein when the number of UL HARQ NACK message is the highest among the feedback messages received from the peer device, the processor determines that the preferred retransmission type of the peer device is a non-adaptive retransmission.

11. The communications apparatus as claimed in claim 2, wherein when the number of retransmit UL grant message with a modulation and coding scheme index larger than 28 is the highest among the feedback messages received from the peer device, the processor determines that the preferred retransmission type of the peer device is an adaptive retransmission with dependency.

12. The communications apparatus as claimed in claim 2, wherein when the number of retransmit UL grant message with a modulation and coding scheme index not larger than 28 is the highest among the feedback messages received from the peer device, the processor determines that the preferred retransmission type of the peer device is an adaptive retransmission without dependency.

13. A method for handling UL data retransmission of a communications apparatus comprising a plurality of RAT modules and at least a radio transceiver shared by the RAT modules, comprising:
    analyzing content of a plurality of feedback messages received from a peer device communicating with a first RAT module of the communications apparatus to determine a preferred retransmission type of the peer device, wherein the feedback messages are transmitted by the peer device to indicate a result of UL data transmission, and wherein the preferred retransmission type is selected from a group comprising a non-adaptive retransmission, an adaptive retransmission with dependency and an adaptive retransmission without dependency;
    recording the preferred retransmission type of the peer device in a memory device;
    receiving a first UL grant message indicating transmission of a first UL data;
    determining whether a forthcoming first feedback message corresponding to transmission of the first UL data is able to be received; and
    when the forthcoming first feedback message is determined unable to be received, determining whether to retransmit the first UL data according to the preferred retransmission type of the peer device.

14. The method as claimed in claim 13, wherein the feedback messages comprise at least one of a retransmit UL grant message and an UL HARQ ACK/NACK message.

15. The method as claimed in claim 13, further comprising:
    determining whether the first UL data is able to be transmitted at a first UL opportunity; and
    when the first UL data is able to be transmitted at the first UL opportunity but the forthcoming first feedback message is unable to be received,
    determining whether to skip the first UL opportunity to transmit the first UL data or make the transmission of the first UL data at the first UL opportunity fail according to the preferred retransmission type of the peer device.

16. The method as claimed in claim 15, further comprising:
skipping the first UL opportunity to transmit the first UL data or making the transmission of the first UL data at the first UL opportunity fail when the preferred retransmission type of the peer device is a non-adaptive retransmission or an adaptive retransmission with dependency.

17. The method as claimed in claim 16, further comprising:
retransmitting the first UL data at a second UL opportunity according to a plurality of parameters carried in the first UL grant message when the preferred retransmission type of the peer device is a non-adaptive retransmission.

18. The method as claimed in claim 15, wherein the forthcoming first feedback message is unable to be received when the radio transceiver is occupied by a second RAT module of the communications apparatus at the time when the forthcoming first feedback message arrives.

19. The method as claimed in claim 13, further comprising:
determining whether the first UL data is able to be transmitted at a first UL opportunity; and
when the first UL data is unable to be transmitted at the first UL opportunity and the forthcoming first feedback message is unable to be received,
retransmitting the first UL data at a second UL opportunity when the preferred retransmission type of the peer device is a non-adaptive retransmission and not retransmitting the first UL data when the preferred retransmission type of the peer device is an adaptive retransmission.

20. The method as claimed in claim 19, wherein the first UL data is unable to be transmitted at the first UL opportunity and the forthcoming first feedback message is unable to be received when the radio transceiver is occupied by a second RAT module of the communications apparatus at the time of the first UL opportunity and at the time when the forthcoming first feedback message arrives.

21. The method as claimed in claim 17, wherein when the preferred retransmission type of the peer device is a non-adaptive retransmission, the first UL data is retransmitted according to a plurality of parameters carried in the first UL grant message.

22. The method as claimed in claim 14, wherein when the number of UL HARQ NACK message is the greatest among the feedback messages received from the peer device, the preferred retransmission type of the peer device is determined as a non-adaptive retransmission, and wherein when the number of retransmit UL grant message with a modulation and coding scheme index larger than 28 is the greatest among the feedback messages received from the peer device, the preferred retransmission type of the peer device is determined as an adaptive retransmission with dependency.

* * * * *